United States Patent [19]

Baur et al.

[11] Patent Number: 5,453,208
[45] Date of Patent: Sep. 26, 1995

[54] OXIDATION OF AMMONIUM IONS AND ORGANIC CARBON IN WASTEWATERS

[75] Inventors: Karl G. Baur, Ludwigshafen; Thomas Papkalla, Mannheim; Ulrich Kanne, Frankenthal; Peter Stops, Altrip, all of Germany

[73] Assignee: BASF Aktiengesellschaft, Ludwigshafen, Germany

[21] Appl. No.: 155,144

[22] Filed: Nov. 22, 1993

[30] Foreign Application Priority Data

Nov. 25, 1992 [DE] Germany .......................... 42 39 487.2

[51] Int. Cl.⁶ ............................................ C02F 1/72
[52] U.S. Cl. .......................... 210/761; 210/762; 210/903
[58] Field of Search .................................. 210/749, 758, 210/761, 766, 903, 762

[56] References Cited

U.S. PATENT DOCUMENTS

| | | | |
|---|---|---|---|
| 4,447,333 | 5/1984 | Wagener et al. | 210/750 |
| 4,721,575 | 1/1988 | Binning et al. | 210/761 |
| 5,232,604 | 8/1993 | Swallow et al. | 210/759 |
| 5,232,605 | 8/1993 | Baur et al. | 210/761 |
| 5,250,193 | 10/1993 | Sawicki et al. | 210/761 |

FOREIGN PATENT DOCUMENTS

| | | | |
|---|---|---|---|
| 976283 | 10/1975 | Canada. | |
| 1105159 | 7/1981 | Canada. | |
| 2740536 | 3/1978 | Germany. | |
| 01310794 | 12/1989 | Japan | 210/761 |
| 1375259 | 12/1972 | United Kingdom. | |
| WO92/18426 | 10/1992 | WIPO. | |

*Primary Examiner*—Peter A. Hruskoci
*Attorney, Agent, or Firm*—Keil & Weinkauf

[57] ABSTRACT

A process for the oxidation of ammonium ions and organic carbon in wastewaters containing ammonium ions and organic carbon by means of nitric acid at from 100° to 350° C., wherein the molar ratio between organic carbon and ammonium nitrogen is adjusted to a value in the range from 0.3:1 to 4:1 by addition of organic carbon or ammonium nitrogen.

5 Claims, 1 Drawing Sheet

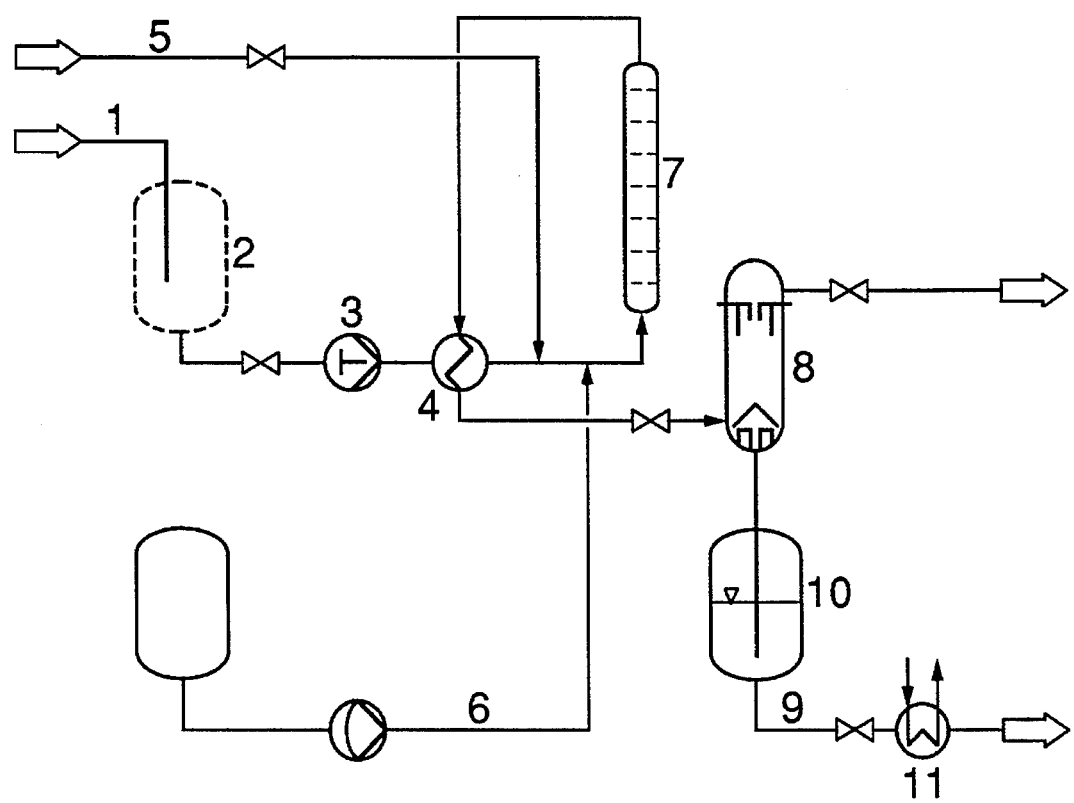

OXIDATION OF AMMONIUM IONS AND ORGANIC CARBON IN WASTEWATERS

The present invention relates to a process for the oxidation of ammonium ions and organic carbon in wastewaters containing ammonium ions and organic carbon by means of nitric acid at from 100° to 350° C.

The treatment of wastewaters from chemical production prior to introduction into a wastewater treatment plant is becoming increasingly important. Ingredients which pass unchanged through a wastewater treatment plant must be eliminated or at least reduced in their concentrations in accordance with the relevant prior art. Moreover, it may be advantageous also completely or partly to eliminate organic ingredients which are readily biodegradable from wastewaters prior to introduction into a wastewater treatment plant, in order to reduce the treatment costs of these wastewaters.

An optimum treatment process for wastewaters should make it possible to eliminate poorly degradable or nondegradable compounds from the wastewater and to reduce the concentration of readily degradable components in the wastewater to such an extent that the costs for this measure are lower than the costs for biodegradation in the wastewater treatment plant.

Ammonium ions present particular problems in wastewaters since said ions pass substantially unchanged through a biological wastewater treatment plant.

Many processes have been described for removing ammonium from wastewaters.

DE-A 2,938,654, for example, describes the reaction between ammonium and nitrogen oxides. The use of gaseous $NO_x$ required here presents process engineering problems also because of the two-phase nature of the reactions.

DE-A 2,740,536 discloses the elimination of ammonium from wastewaters by reaction with nitrite. This process cannot be used for removing poorly biodegradable compounds, and furthermore salts have to be added to the wastewater.

DE-A 2,262,754 discloses a process for the treatment of wastewater, in which carbon-containing impurities are oxidized by nitric acid at elevated temperatures in the aqueous phase to give gaseous reaction products. Ammonium ions, too, are degraded, but not to a sufficient extent, as is evident from the examples.

WO 92/18,426 discloses a process for the degradation of nitrogen compounds in wastewaters, in which the proportions of compounds containing nitrogen in various oxidation states are adjusted so that a nitrogen oxide-free offgas is produced on heating the wastewater at from 300° to 600° C. Organic carbon present interferes in this process.

It is an object of the present invention to provide a process which permits virtually quantitative degradation of ammonium ions in wastewaters and which can be carried out very simply in terms of process engineering, a substantial reduction in the content of organic compounds in the wastewater also being achieved. Furthermore, the wastewater should not be polluted by the addition of relatively large amounts of other substances, such as nitrites or nitrates.

We have found that this object is achieved by a process for the oxidation of ammonium ions and organic carbon in wastewaters containing ammonium ions and organic carbon by means of nitric acid at from 100° to 350° C., wherein the molar ratio between organic carbon and ammonium nitrogen is adjusted to a value in the range from 0.3:1 to 4:1 by addition of organic carbon or ammonium nitrogen.

In a particularly advantageous embodiment of the novel process, the molar ratio between organic carbon and ammonium nitrogen is adjusted to a value in the range from 0.7:1 to 2:1.

In order to eliminate the ammonium ions from wastewaters by the novel process, the wastewaters must contain a sufficient amount of organic carbon. This reduces the nitric acid presumably to give nitrous acid as an intermediate, which can then undergo synpro-portionation with ammonium ions to form nitrogen.

Organic carbon is usually determined as TOC (total organic carbon), which gives n, the number of moles of organic carbon per liter of wastewater, from the equation $$n = \frac{TOC}{12}.$$

Wastewaters which, because they contain too little organic carbon, have a molar ratio between organic carbon and ammonium nitrogen which is not within the range according to the invention are treated with organic carbon.

This can be achieved, for example, by mixing with other wastewaters containing more organic carbon or by adding other oxidizable organic wastes.

Ammonium-containing wastewaters very frequently also contain primary, secondary or tertiary amines which provide the carbon required, the concentration of the amines themselves being significantly reduced. The novel process is therefore particularly useful for the treatment of wastewaters from amine production.

Wastewaters which, because they contain too little ammonium nitrogen, have a molar ratio between organic carbon and ammonium nitrogen which is not within the range according to the invention are treated with the requisite amount of ammonium nitrogen.

This can be achieved, for example, by mixing with other wastewaters containing more ammonium nitrogen or by adding ammonium nitrogen-containing compounds, which are produced in chemical production as waste materials, for example ammonium sulfate from the production of caprolactam.

If wastewaters which contain organic carbon but no ammonium ions are treated with nitric acid, substantial oxidation of the organic ingredients occurs. The nitric acid used is reduced predominantly to nitric oxide, as well as to nitrogen dioxide and minor amounts of nitrogen and nitrous oxide. This indicates that the oxidation reaction of the organic ingredients with the nitric acid is not very clear.

It is very surprising that, in the presence of ammonium ions, the latter intervene in the oxidation/reduction mechanism in such a way that, regardless of the type of organic compounds, ammonium ions are virtually quantitatively converted into nitrogen.

The addition of nitric acid to wastewater in the novel process is carried out in a conventional manner and can be adapted in a flexible way to the existing wastewater or to the desired degradation of ammonium ions and organic carbon. This makes the novel process particularly adaptable and cost-efficient compared with wet oxidation or other processes known to date. The total amount of nitric acid required in the case of conventional wastewaters is advantageously from 1 to 10% by weight, based on the wastewater.

The nitric acid used may be any nitric acid conventionally used in industry, including contaminated nitric acid. Preferred pressure-resistant containers are tube reactors, or autoclaves connected in a cascade. Since the enthalpy of reaction can be neglected in the case of small amounts of ingredients, based on water, the reaction can in this case be carried out adiabatically, so that very simple reactors maybe used. These reactors need guarantee only a minimum required residence time while avoiding back-mixing. Consequently, the process is technically extremely simple to carry out and advantageous in terms of the capital costs compared with the widely used wet oxidation. At a sufficiently high temperature, the residence time to be maintained is in the region of a few minutes, which leads to small reactors.

The pressures used are preferably from 20 to 190 bar, in particular from 40 to 120 bar, and the temperatures at which the process is carried out are in particular from 240° to 300° C.

In the case of dilute wastewaters, the wastewater must be heated directly or indirectly. In the case of concentrated wastewaters, the process takes place auto-thermally (similarly to the wet oxidation).

It is particularly preferable to carry out the novel process continuously.

It has been found that a few minutes are sufficient as the residence time of the wastewater in the reactor in the novel process in order to degrade the ammonium ions, particularly when the process is effected continuously.

It has furthermore been found that the process can be carried out particularly advantageously at a pH of $\leq 6$.

It is possible to remove both readily biodegradable and poorly biodegradable compounds from the wastewaters. The process according to the invention is therefore distinguished by low process complexity, high efficiency and particular flexibility.

BRIEF DESCRIPTION OF THE DRAWINGS

The FIGURE shows an example of a preferred embodiment of the instant process.

In the FIGURE, the wastewater, which may be enriched with organic carbon, depending on the TOC content, is conveyed via the feed pipe (1), if necessary from an intermediate tank (2), by means of a pump (3) through a heat exchanger (4) in which it is preheated to, for example, 270° C. The preheated wastewater is then heated to 290° C. by directly feeding in high pressure steam at 100 bar via pipe (5) or by indirect heating. After adjustment of the nitric acid concentration required for the degradation of ammonium, for example via a feed pipe (6), in the wastewater at 290° C. the latter is conveyed through a reactor (7) without back-mixing (for example, a tube reactor having baffles which is lined with titanium). After a residence time of, for example, from 5 to 10 minutes, the reaction solution is cooled by being passed countercurrent to the feed and is let down in a separator (8). The wastewater is removed by means of a pipe (9) via an intermediate tank (10) and heat exchanger (11).

A tube reactor in which the flow of the liquid is adjusted so that there is no back-mixing is preferably used for the continuous embodiment of the process.

EXAMPLES

Example 1

Degradation of Ammonium with Nitric Acid in the Presence of Organic Carbon

In an autoclave, a solution of 1% of ammonium sulfate, 5% of nitric acid and 3% of formaldehyde (calculated as 100%) was kept at 250° C. (50 bar) for 8 hours and then cooled and let down, and the content of ammonium was determined. The analysis indicated an ammonium degradation of >97%.

Example 2 (Comparative Example)

Degradation of Ammonium with Nitric Acid in the Absence of Organic Carbon

In an autoclave, a solution of 1% of ammonium sulfate and 5% of nitric acid was kept at 250° C. (50 bar) for 8 hours and then cooled and let down, and the content of ammonium was determined. The analysis indicated an ammonium degradation of 35%.

Example 3

An industrial wastewater having the stated composition was treated in a tube reactor under the reaction conditions stated under A) and B):

Composition of the wastewater:

TOC: 1.4%

Total N: 1.1%

$NH_4^+$: 1.1%

Composition of the wastewater after the treatment under various conditions:

| Residence time [min] | TOC [%] | Total N [%] | $NH_4^+$ [%] | $NO_3^-$ [%] | $NO_2^-$ [%] |
| --- | --- | --- | --- | --- | --- |
| A) Reactor temperature = 280° C., pressure = 90 bar, $HNO_3$ = 5% by weight | | | | | |
| 10 | 0.71 | 0.15 | 0.025 | <0.005 | <0.005 |
| 5 | 0.74 | 0.15 | 0.024 | <0.005 | <0.005 |
| B) Reactor temperature = 260° C., pressure = 90 bar, $HNO_3$ = 5% by weight | | | | | |
| 10 | 0.75 | 0.15 | 0.023 | <0.005 | <0.005 |
| 5 | 0.75 | 0.15 | 0.020 | <0.005 | <0.005 |

The degradation of ammonium was >97.5% under all reaction conditions, the TOC content being reduced by about 50%.

Example 4

The following wastewater was treated similarly to Example 2:

Composition of the wastewater:

TOC: 0.37%

Total N: 0.23%

$NH_4^+$: 0.30%

After the treatment with 2% by weight of $HNO_3$ at 280° C. and 80 bar and in a residence time of 10 minutes, the wastewater had the following composition:

TOC=0.16%;

$NH_4^+$=0.005%;

$NO_2^-$=<0.005%;

$NO_3^-$=0.005%;

total N=0.03%

Example 5

The following wastewater was treated similarly to Example 3:

Composition of the wastewater:

TOC: 0.33%

Total N: 0.54%

$NH_4^+$: 0.60%

After the treatment with 3% of $HNO_3$ at 270° C. and 80 bar and in a residence time of 10 minutes, the wastewater had the following composition:

TOC=0.06%;
$NH_4^+$=<0.002%;
total N=0.05%

The analysis of the resulting waste gas gave the following composition:

$N_2$=67.5% by volume;
NO=1.09% by volume;
$NO_2$=0.11% by volume
$N_2O$=1.32% by volume;
CO=16.5% by volume;
$CO_2$=12.9% by volume

We claim:

1. In a process for the oxidation of ammonium ions and organic carbon in wastewaters containing ammonium ions and organic carbon by means of nitric acid at from 100° to 350° C. and at a sufficient pressure and for a time effective to oxidize the ammonium ions and organic carbons, the improvement which comprises: adjusting the molar ratio between organic carbon and ammonium nitrogen in said wastewaters to a value in the range from 0.3:1 to 4:1 by addition of organic carbon or ammonium nitrogen prior to said oxidation, wherein the amount of free nitric acid in the wastewater is 1–10% by weight and oxidation is carried out at a pH of ≦6.

2. An improved process as defined in claim 1, wherein the molar ratio between organic carbon and ammonium nitrogen is adjusted to a value in the range from 0.7:1 to 2:1.

3. An improved process as defined in claim 1, wherein the wastewaters are heated to 240°–300° C.

4. An improved process as defined in claim 1, which is carried out continuously.

5. An improved process as defined in claim 4, which is carried out in a tube reactor.

* * * * *